United States Patent [19]

Cannata et al.

[11] Patent Number: 5,764,545
[45] Date of Patent: Jun. 9, 1998

[54] DISK DRIVE TEST SEQUENCE EDITOR

[75] Inventors: John W. Cannata, Santa Barbara; Rodney K. Whitehouse, Fremont, both of Calif.

[73] Assignee: Phase Metrics, San Diego, Calif.

[21] Appl. No.: 623,962

[22] Filed: Mar. 29, 1996

[51] Int. Cl.$^6$ ..................................................... G11B 5/02
[52] U.S. Cl. ........................... 364/580; 364/186; 364/191
[58] Field of Search .................................... 364/148, 184, 364/185, 186, 188, 191, 192, 550, 551.01, 552, 580; 371/72; 360/25, 31, 69, 75; 395/180, 183.01, 183.03, 183.22, 183.14

[56] References Cited

U.S. PATENT DOCUMENTS

| | | | |
|---|---|---|---|
| 4,725,968 | 2/1988 | Baldwin et al. | 364/550 |
| 5,047,874 | 9/1991 | Yomtoubian | 360/25 |
| 5,124,849 | 6/1992 | Chur | 360/31 |
| 5,371,883 | 12/1994 | Gross et al. | 395/183.14 |
| 5,410,439 | 4/1995 | Egbert et al. | 360/75 |
| 5,422,890 | 6/1995 | Klingsporn et al. | 371/21.6 |
| 5,504,571 | 4/1996 | Eckerman et al. | 356/28.5 |
| 5,581,491 | 12/1996 | Biwer et al. | 364/580 |

*Primary Examiner*—Kevin J. Teska
*Assistant Examiner*—Edward J. Pipala
*Attorney, Agent, or Firm*—Blakely Sokoloff Taylor & Zafman

[57] ABSTRACT

An apparatus for creating or editing a test program for testing a disk drive by entry command inputs. The apparatus includes an input that allows the user to select the desired test instructions and subsequence of test instructions to create or edit a test program having a sequence of test instructions. The processor executes the test program by generating a plurality of commands that are performed in a predetermined order. The commands may specify that the first circuit performs a glide test or a burnish test or that the second circuit perform a burnish test.

23 Claims, 3 Drawing Sheets

PRIOR-ART

DISK DRIVE TEST SEQUENCE EDITOR

BACKGROUND OF THE INVENTION

1. Field of the Invention

The present invention relates generally to the field of automated test equipment. More specifically, the present invention relates to automated test equipment for testing data recording media.

2. Discussion of Related Art

Generally, disk drives are functionally tested by automated testers that perform burnish, glide and certification tests on the disk drive media. The glide test determines if there is a protuberance, such as a bump, on the surface of the disk and in the event a protuberance is detected, a burnish test is performed to grind the protuberance. Certification tests are used for both parametric and defect scan testing. A parametric test is a sample test that tests certain parameters, such as the amplitude of a signal on a certain track, whereas a defect scan test scans the surface of the disk to test for distortions on the signals.

Typically, automated testers for disk drive media include a mechanical portion and an electrical portion. The mechanical portion includes a spindle for rotating the disk and at least one glide carriage, certification carriage and burnish carriage. Each of the carriages includes a head to interface with the disk such that data can be coupled to and from the disk. The electrical portion includes the electronics for controlling the mechanical portion of the automated tester and for analyzing the signals received from the disk.

Typically, automated testers test disk drive media according to a test program having a predetermined sequence of test instructions. In other words, the test program executes a fixed sequence of test instructions that can not be edited or is extremely difficult to edit. For example, if the test program selects the certification test which is programmed to first run a parametric test and then a scan defect test on a particular track, then each time the certification test is selected, the parametric test is performed first and the scan defect test is performed second on the tracks specified. Thus, the sequence of test instructions is arranged such that a subsequence of test instructions specifying a parametric test is listed before a subsequence of test instructions specifying a defect test. The disadvantage of having a test program with a fixed sequence of test instructions is that the user does not have the flexibility of editing or creating a particular sequence to optimize the test program.

Therefore, an automated tester having a sequence editor to edit or to create customized test programs is desirable. For example, the sequence editor allows the user to specify those test instructions or subsequences of test instructions most likely to cause a failure to be performed before other test instructions or subsequences of test instructions which are not as likely to cause a failure, or to specify the order of test instructions or subsequences of test instructions to minimize the carriage movement. Thus, the user may reduce the test time to test each disk drive platter. Furthermore, the sequence editor provides the added flexibility of creating new subsequences of test instructions from a combination of existing test instructions and existing subsequences of test instructions. A new subsequence of test instructions may operate as its own test program or may be used as a building block for another test program.

SUMMARY OF THE INVENTION

The present invention is a disk drive tester that allows the user to create or edit a test program for testing a disk drive media. The disk drive tester includes a processor coupled to a first circuit and a second circuit via a data bus. The user creates or edits the test program having a sequence of test instructions by inputting entry commands that select the test instructions and the subsequences of test instructions desired. The processor executes the sequence of test instructions in the test program by generating a plurality of commands that are performed in a predetermined order. The first circuit performs a glide test in response to a plurality of commands specifying a glide test and performs a burnish test in response to a plurality of commands specifying a burnish test. The second circuit performs a certification test in response to a plurality of commands specifying a certification test.

The present invention also covers a method for creating or editing a customized disk drive media test program by having the user interact with the disk drive tester. A customized test program having a sequence of test instructions is created or edited by selecting one or more test instructions or a sequence of test instructions from a plurality of test instructions stored in the disk drive tester and defining the order of execution of each test instructions to create the customized test program.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PRESENT INVENTION

The following detailed description sets forth several embodiments in accordance with the present invention for a method and apparatus for a sequence editor. In the following description, specific system configurations are used in order to provide a thorough understanding of the present invention. It will be evident, however, that the present invention may be practiced without providing the details of each system component. In other instances the functioning of well-known system components have not been described in particular detail so as not to obscure the present invention.

Automated test equipment for testing disk drive media or other data recording media includes both a mechanical portion and an electrical portion. The electrical portion typically includes the glide electronics, the certification controller and the signal analyzer, and the mechanical portion includes the carriages for moving the head to and from the disk which is rotating on the spindle. The certification head is used to interface the electronics with the disk such that signals can be written to or read from the disk during testing. The glide head detects protuberances on the surface of the disk and the burnish head physically grinds the surface of the disk when a protuberance is detected.

Figure 1:
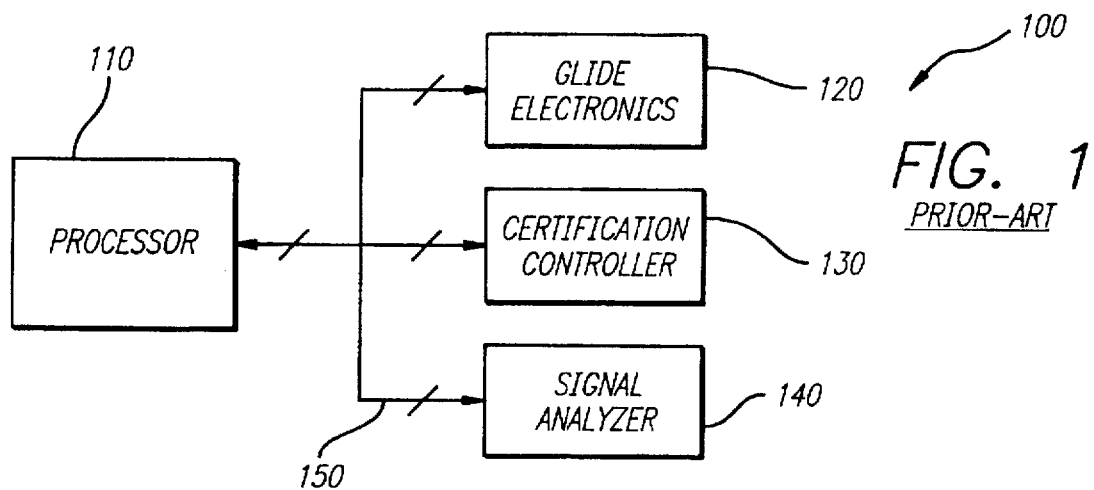
FIG. 1 is an illustration of the prior art disk drive testing system.

FIG. 1 illustrates the prior art disk drive testing system 100 having a processor system 110 coupled to the glide electronics 120, the certification controller 130 and the signal analyzer 140 via bus 150. The glide electronics 120 performs a glide test on a disk drive by controlling the glide mechanics and by processing the signals generated when the glide head glides over the surface of the disk. The certification controller 130 and the signal analyzer 140 perform the certification test by having the certification controller 130 control the certification mechanics and by having the signal analyzer 140 control the writing, the reading and the analyzing of magnetic signals to and from the disk. Each of these circuits may comprise ordinary digital logic designed to perform these functions.

According to FIG. 1, the test instructions for performing a glide and burnish test are hardwired into the glide electronics such that the glide and burnish tests are programmed to run according to a fixed sequence. Likewise, the test instructions for performing a certification test is normally hardwired into the certification electronics in the signal analyzer 140 such that the certification test is programmed to run according to a fixed sequence. Since the burnish electronics and the certification electronics are responsible for executing the burnish/glide tests and the certification test, respectively, these tests are almost entirely executed independently of the processor system 110. Therefore, the prior art disk drive testing system 100 lacks the capability of editing or creating a sequence of test instructions for either the burnish/glide test or the certification test.

Figure 2:
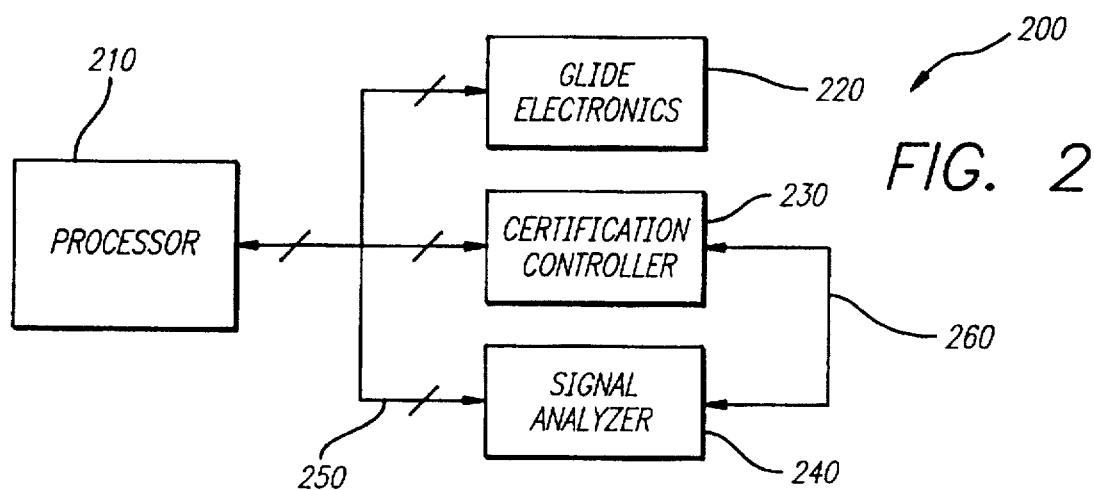
FIG. 2 is an illustration of one embodiment of the disk drive testing system of the present invention.

FIG. 2 illustrates one embodiment of the present invention used for testing disk drive media. It is appreciated that the present invention may also be used to test other types of data recording media that rotate. The disk drive testing system 200 includes the processor 210, the glide electronics 220, the certification controller 230 and the signal analyzer 240. The glide electronics 220, the certification controller 230 and the signal analyzer 240 are coupled to the processor 210 via a bus 250. In one embodiment, the processor 210 is an IBM compatible personal computer having a 133 megahertz (MHz) Pentium™ processor manufactured by Intel Corporation and the bus 250 is a general purpose interface bus (GPIB).

In accordance with the present invention, the processor system 210 includes a sequence editor that allows the user to customize a disk drive test program having a sequence of test instructions by entry of input commands. As mentioned above, the processor system 110 in the prior art provides the user with the capability of executing test programs having a predetermined sequence of test instructions hardwired into the testing system. Because the test programs are hardwired into the testing system, the user can not conveniently edit the test program by inputting entry commands. Furthermore, the processing system 210 in the present invention provides the processing power for executing the customized test programs, whereas the glide electronics 120, the certification controller 130 and the signal analyzer 140 in the prior art are primarily responsible for executing the test programs having a predetermined sequence of test instructions with very little involvement from the processor system 110.

A test program can be customized by creating or editing a new sequence of test instructions from individual test instructions or subsequences of test instructions. As defined in the context of this specification, a subsequence of test instructions is a sequence of test instructions which are executed in a predetermined order. There are a number of possible subsequences for testing a disk drive such as the certification sequence, the glide sequence, the burnish sequence and the binner sequence. Therefore, individual test instructions as well as subsequences of test instructions can be used as building blocks to create or edit a test program. Note that a test instruction includes an instruction that is executed by the processor to either control some aspect of the hardware of the testing system or to process data.

Figure 5:
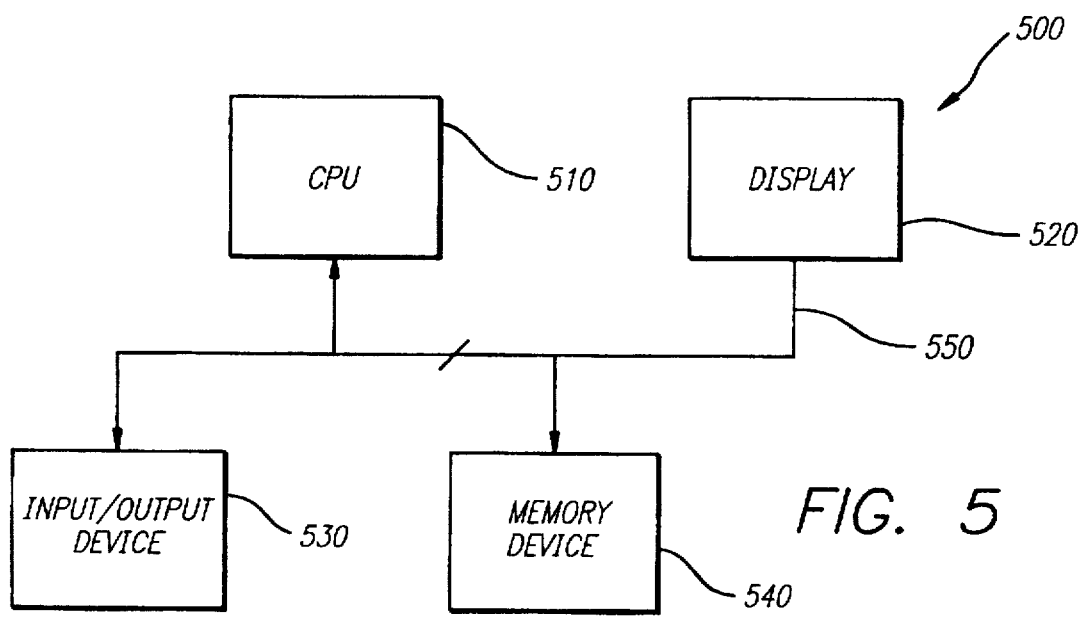
FIG. 5 is an illustration of one embodiment of the processor in the disk drive testing system.

FIG. 5 illustrates one embodiment of the processor system 210. According to FIG. 5, the processor 500 includes a CPU 510 coupled to an input/output device 530, a memory device 540 and a display 520 via a data bus 550. In one embodiment, the CPU 510 is a 133 MHz Pentium™ processor manufactured by Intel Corporation. The input/output device 530 includes both the alphanumeric oriented input/output devices such as a keyboard or a mouse and real-time data-oriented input/output devices such as Analog-to-Digital Converters (A/D) and Digital-to-Analog Converters (D/A). The memory device 540 includes random access memory (RAM), read-only memory (ROM) and mass memory devices such as a disk drive. The display device 520 is a computer terminal. The data bus 550 is used for communication between the CPU and the memory or the peripheral devices.

Once the user creates or edits the test program by selecting the desired test instruction or subsequence of test instructions via the input/output device 530, the test program is saved as a file in the memory device 540. The test instructions or the subsequence of test instructions selected are retrieved from a memory device such as the memory device 540 or memory located within the CPU 510. To execute the test program, the CPU 510 retrieves the file from the memory device 540. The CPU 510 then executes the test program by sequentially executing each of the test instructions in the test program, starting with the first test instruction in the sequence and ending with the last test instruction in the sequence. The sequence of test instructions may be represented by a stream of data or a list of test instructions. While executing the test program, the CPU 510 generates a test result which typically indicates whether or not the disk drive passes the test program. The test result is displayed on the display device 520.

The user may customize the test program by selecting the desired test instructions and/or subsequence of test instructions and then defining the order of execution of each of the test instructions selected by inputting entry commands into the processor system 210 via a user interface. In one embodiment of the present invention, the user may interact with the processor through the Windows 95 graphical user interface manufactured by Microsoft. However, the present invention may also be implemented using operating systems such as Unix, Windows NT, Mac O/S, DOS and IBM O/S. Thus, with the use of an input/output device such as a keyboard or mouse, the user selects the test instruction or subsequence of test instructions desired. While the user is selecting the sequence of test instructions, the user also defines the order of execution by placing each selected test instruction in the correct location in the sequence which may be represented by list or a stream of test instructions. Thus, the processor sequentially executes each test instruction starting with the first test instruction in the list or stream and ending with the last test instruction in the list or stream.

By allowing the user to customize test programs via the user interface, the user has the flexibility of optimizing each test program for his/her particular needs. For example, if a user finds it advantageous to reduce the test time for a disk drive media, he/she may customize a test program to perform those test instructions or subsequences of test instructions most likely to cause a failure first. Thus, a disk drive media that does not pass, the test program may be detected earlier in the testing and thereby reducing the test time.

The test instructions or the subsequences of test instructions available to the user either controls some aspect of the hardware or processes data. For example, if a burnish and a glide test subsequence is specified by the user in the test program, then the processor 210 sends a series of commands to the glide electronics 220 to run a glide and burnish test on the disk drive. Likewise, if a certification test subsequence is selected, then the processor 210 sends a series of commands to the certification electronics to run a certification test on the disk drive. Note that the certification controller 230 and the signal analyzer 240 work together via a communications link 260 to perform the certification test. Therefore, when executing each subsequence each test instruction either causes the hardware to perform some function or processes data during the execution of the test subsequence.

Figure 3A:
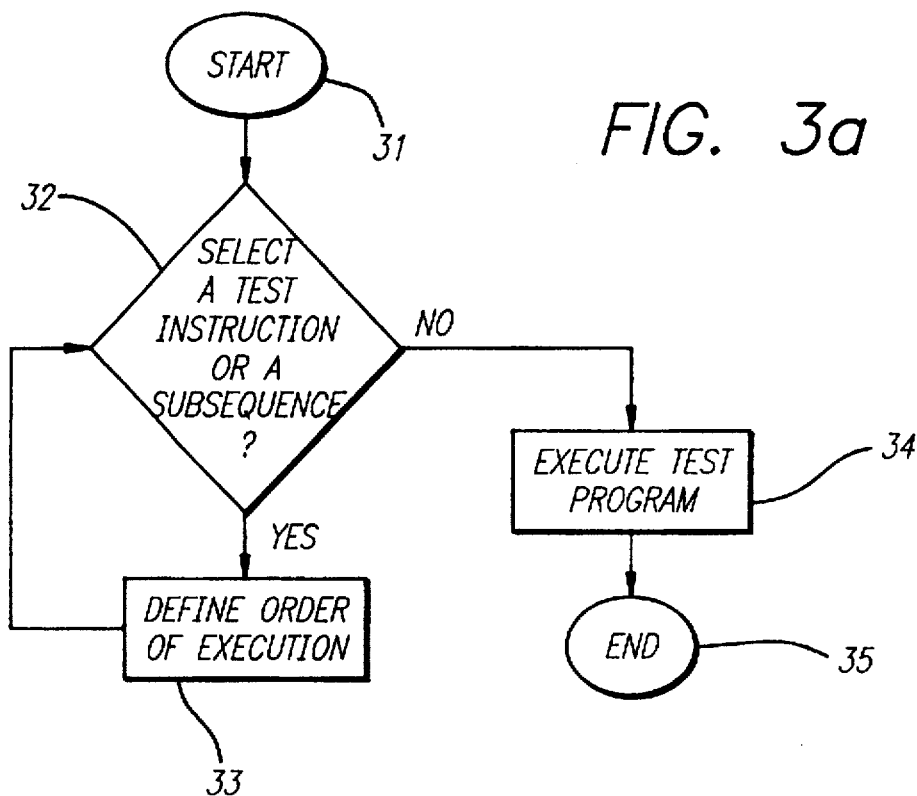
FIG. 3a illustrates a flow chart to create and execute a customized test program.

FIG. 3a is a flow chart illustrating the steps involved in creating or editing a customized test program by inputting entry commands into a processor. The flow chart starts at step 31 and ends at step 35. In order to create or edit a test program, the user selects a test instruction or a subsequence of test instructions by inputting entry command into the processing system 210 via its user interface, as shown in step 32. Next, the user defines the order of execution of the selected test instruction or subsequence of test instructions within the test program in step 33. In other words, the user specifies when the selected test instruction or subsequence of test instructions should be executed in relation to the other test instructions or subsequence of test instructions in the test program. After step 33, the user may select and define the order of execution of another test instruction or subsequence. Once the user has finished selecting and defining the order of execution of all the test instructions and subsequences that he/she wishes to incorporate into the test program, the user has created a customized test program which is to be executed in step 34. The test program is executed to determine whether the disk drive media passes or fails the customized test program.

Figure 3B:
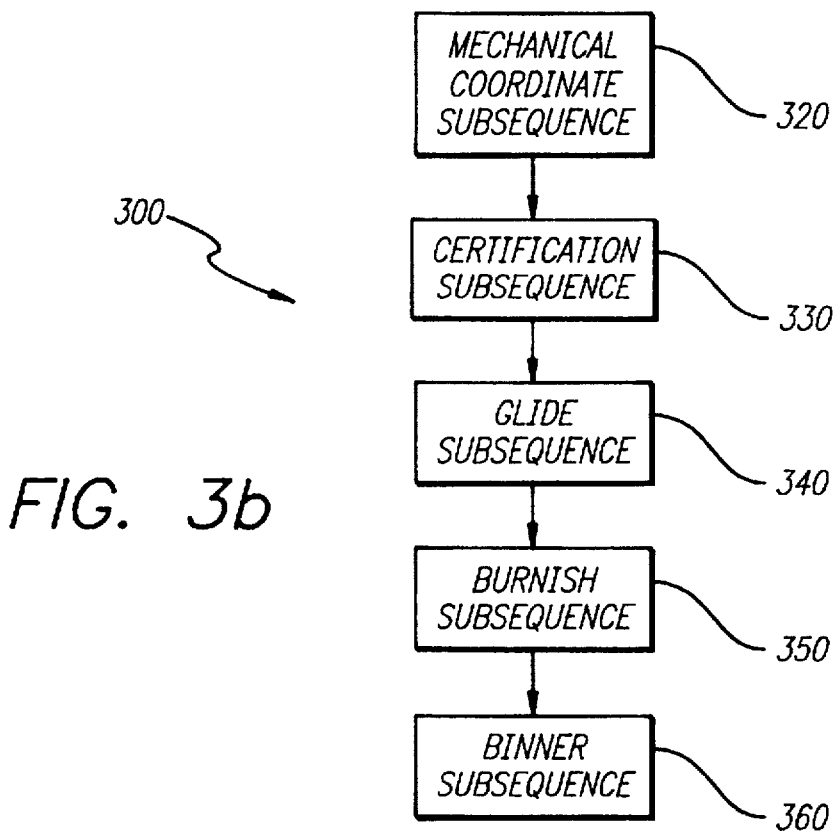
FIG. 3b is an illustration of a test program having a sequence of subsequences.

FIG. 3b is an example of a test program 300 including a sequence of subsequences that is created and executed in accordance with the flow chart in FIG. 3a. According to FIG. 3b, the first subsequence to be performed is the mechanical coordinate subsequence 320 which prepositions the carriage and the spindle. Once the carriage and the spindle are properly positioned, then a certification test specified by the certification subsequence 330, a glide test specified by the glide subsequence 340, a burnish test specified by the burnish subsequence 350 are performed on the disk in the order described. After executing the various test subsequences, the binner subsequence 360 is executed to classify the disk drive into a particular grade or level of performance.

In one embodiment of the present invention, the test instructions, are implemented with three main types of C++ objects—flow objects, math objects and test objects. In this embodiment, each object causes the processor to execute a certain type of command. The test objects are the ones that interact with the outside world and cause the hardware to perform some function, the flow objects control the program flow through conditional branches and looping and for encapsulating subsequences, and the math objects manipulate variables.

Figure 4:
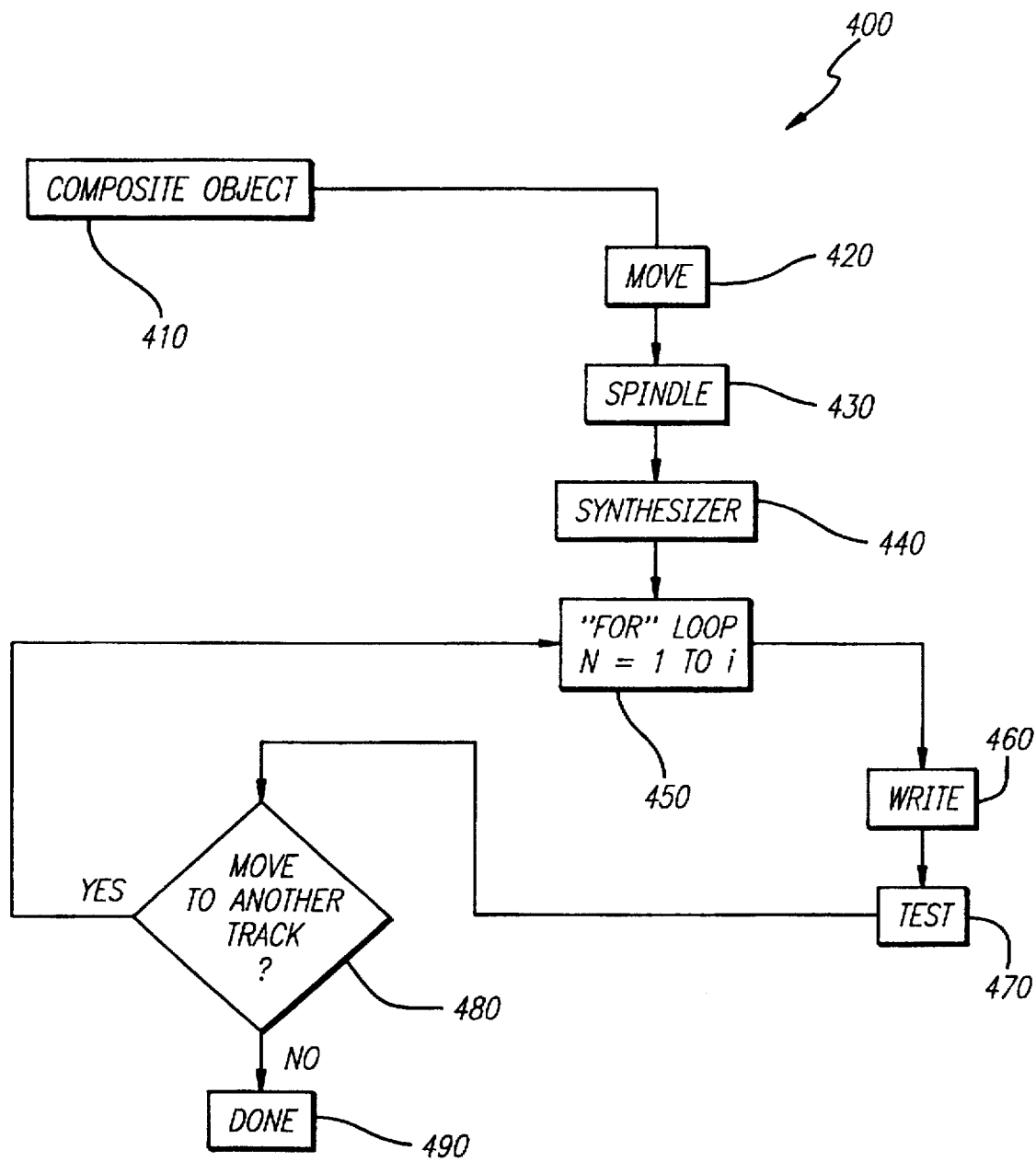
FIG. 4 is an illustration of a subsequence having a sequence of test instructions.

FIG. 4 is an example of a sequence of test instructions that includes various objects. The sequence 400 may be the entire test program or may be a subsequence in a test program. The composite object 410 indicates the starting point for the sequence. Once the carriage is positioned by the "move" object 420, the "spindle" object 430 sets the spindle to a specified rotations per minute (rpm) and the synthesizer sets the frequency of the frequency synthesizer in the signal analyzer 240. The "for" loop 450 includes the "write" object 460, the "test" object 470 and the "move" object 480. The "for" loop 450 is repeated i times. The "for" loop writes data onto a track and then tests the data on the track. Next, the "for" loop moves the head to a different track if specified by the user and then repeats the "write" object 460 and the "test" object 470. For example, data may be written into and tested on tracks 1 to 100. Once all the tracks have been tested according to the "for" loop, then the execution of the test program is done, as specified by step 490. Note that this subroutine may be referred to as a subsequence of test instructions. Therefore, by using objects to build a sequence, the user can generate a customized test program to test the disk drive media.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regard in an illustrative rather than a restrictive sense.

We claim:

1. An apparatus for testing a disk drive media comprising:
   a bus;
   a processor system coupled to said bus, said processor system having an input that receives entry command inputs wherein said entry command inputs select at least one test instruction or subsequence of test instructions that is used for creating or editing a test program having a sequence of test instructions and defines an order of execution of said sequence of test instructions, said processor system executes said sequence of test instructions by generating a plurality of commands that are performed in a predetermined order in accordance with said order of execution;
   a first circuit coupled to said bus, said first circuit performing glide tests and/or burnish tests in response to said plurality of commands from said processor; and
   a second circuit coupled to said bus, said second circuit performing certification tests in response to said plurality of commands from said processor.

2. The apparatus of claim 1, wherein said glide test detects defects on the surface of said disk drive media and said burnish test grinds the surface of said disk drive media when a defect is detected.

3. The apparatus of claim 1, wherein said certification test performs parametric and scan defect testing.

4. The apparatus of claim 1, wherein a subsequence of test instructions is a plurality of test instructions arranged in a predetermined order.

5. The apparatus of claim 1, wherein said processor sequentially executes each of said test instructions in said sequence of test instructions by starting with a first test instruction in said sequence of test instructions and ending with a last test instruction in said sequence of test instructions.

6. An apparatus for testing a data recording media comprising:
   an input receiving entry command inputs wherein said entry command inputs select at least one test instruction or subsequence of test instructions that is used for creating or editing a test program having a sequence of test instructions and defines an order of execution of said sequence of test instructions;

a memory storing said test program;

a CPU coupled to said memory and said input, said CPU accesses said test program from said memory and executes said sequence of test instructions in said test program in said order of execution to generate a test result indicating whether said data recording media passes or fails said test program; and a display coupled to said CPU, said display provides a display of said test result.

7. The apparatus of claim 6, wherein a subsequence of test instructions is a plurality of test instructions arranged in a predetermined order.

8. The apparatus of claim 6, wherein said CPU sequentially executes each of said test instructions in said sequence of test instructions by starting with a first test instruction in said sequence of test instructions and ending with a last test instruction in said sequence of test instructions.

9. The apparatus of claim 6, wherein said test program may be selected as a subsequence for creating or editing a new test program.

10. The apparatus of claim 6 further comprising a bus, a first circuit and a second circuit, wherein said bus is coupled to said CPU, said first circuit and said second circuits.

11. The apparatus of claim 10, wherein said first circuit performs a glide test on said data recording media when said CPU executes a subsequence of test instructions specifying a glide test and performs a burnish test on said data recording media when said CPU executes a subsequence of test instructions specifying a burnish test.

12. The apparatus of claim 10, wherein said second circuit performs a certification test on said data recording media when said processor executes a subsequence of test instructions specifying a certification test.

13. A method for testing a disk drive media with a test program comprising the steps of:

(a) selecting at least one test instruction or subsequence of test instructions stored in a memory, that is used to edit or create said test program having a sequence of test instructions, by entry of command inputs provided to a processor system;

(b) defining an order of execution of said sequence of test instructions in said test program by said entry command inputs to said processor system;

(c) executing, by said processor system, said sequence of test instructions in said test program in said order of execution; and (d) generating a test result in response to said test program.

14. The method of claim 13 further including the step of displaying said test result.

15. The method of claim 13 wherein selecting at least one of said test instructions or said subsequence of test instructions in step (a) includes the step of receiving at least one entry command input wherein each of said entry command inputs selects one of said test instructions or said subsequences of test instructions.

16. The method of claim 13 wherein defining said order of execution of said sequence of test instructions in said test program in step (b) includes the step of generating a list of test instructions such that a first test instruction to be executed is at the top of said list of test instructions and a last test instruction to be executed is at the bottom of said list of test instructions.

17. The method of claim 13 wherein step (b) includes the step of saving said test program in a memory device.

18. The method of claim 13 wherein step (c) includes the step of sequentially executing each of said test instructions in said test program according to said order of execution defined in step (b).

19. The method of claim 13 wherein step (c) further includes the step of loading said test program from said memory device into a processor.

20. A method for creating or editing a customized disk drive media test program by interacting with a disk drive tester, comprising the steps of:

(a). selecting at least one test instruction or subsequence of test instructions from a plurality of test instructions stored in said disk drive tester;

(b) defining an order of execution of each of said test instructions selected for said customized disk drive media test program; and (c) executing said test instructions in accordance with said order of execution.

21. A method of claim 20 wherein step (a) further includes the step of receiving at least one entry command input wherein each of said entry command inputs selects one of said test instructions or said subsequence of test instructions.

22. The method of claim 20 wherein step (b) includes the step of generating a list of test instructions such that a first test instructions to be executed is at the top of said list of test instructions and a last test to be executed is at the bottom of said list of test instructions.

23. The method of claim 20 wherein each of said test instructions is a C++ object.

* * * * *